April 26, 1966     A. G. CARTER     3,248,149
SEAT BELT TERMINAL SYSTEM
Filed Aug. 8, 1963     5 Sheets—Sheet 1
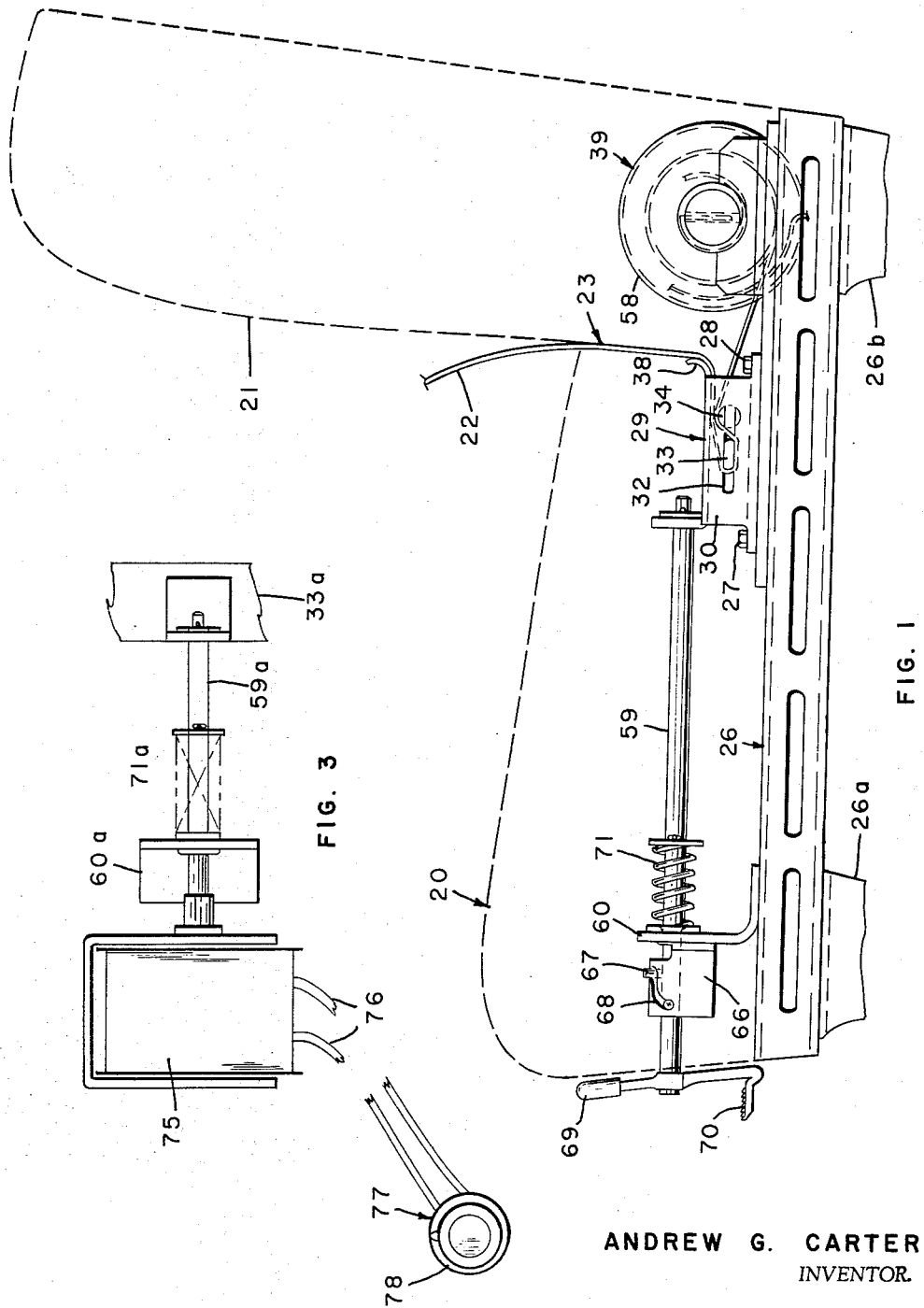
ANDREW G. CARTER
*INVENTOR.*

April 26, 1966   A. G. CARTER   3,248,149
SEAT BELT TERMINAL SYSTEM
Filed Aug. 8, 1963   5 Sheets-Sheet 2
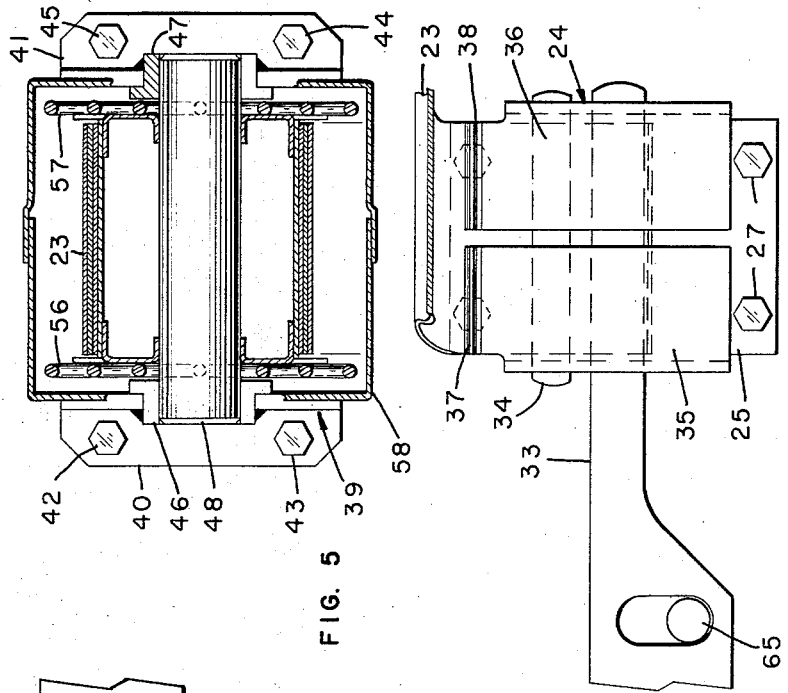
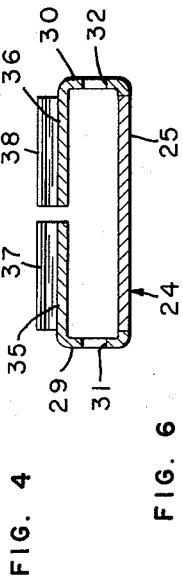
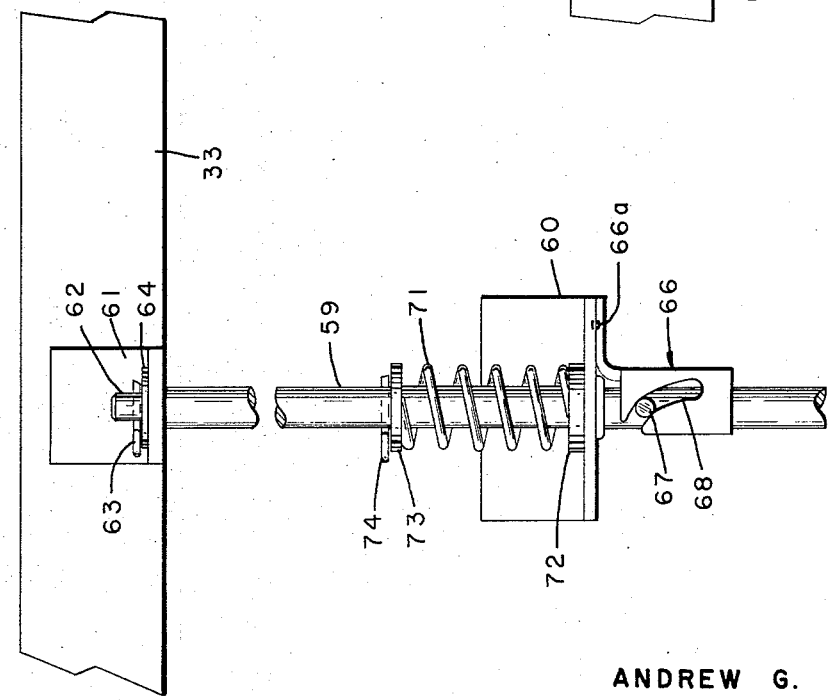
ANDREW G. CARTER
INVENTOR.
BY April 26, 1966  A. G. CARTER  3,248,149
SEAT BELT TERMINAL SYSTEM
Filed Aug. 8, 1963  5 Sheets-Sheet 3

ANDREW G. CARTER
*INVENTOR.*

BY

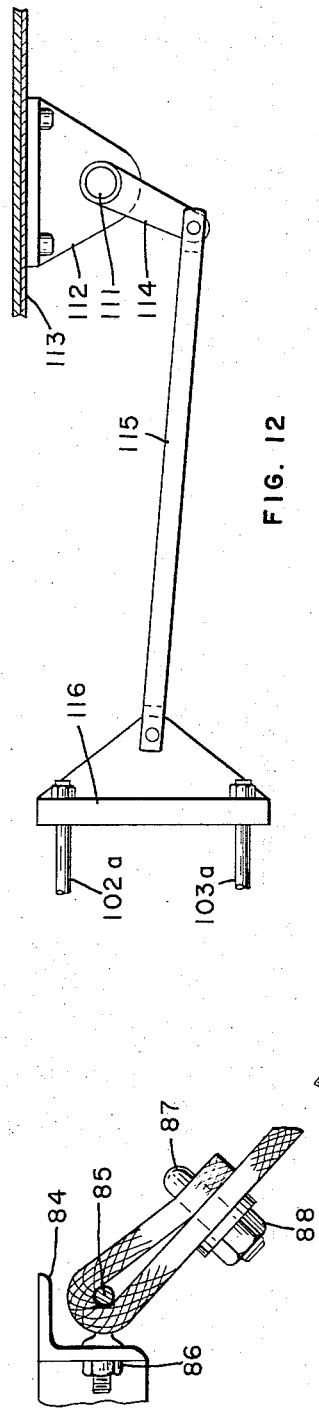
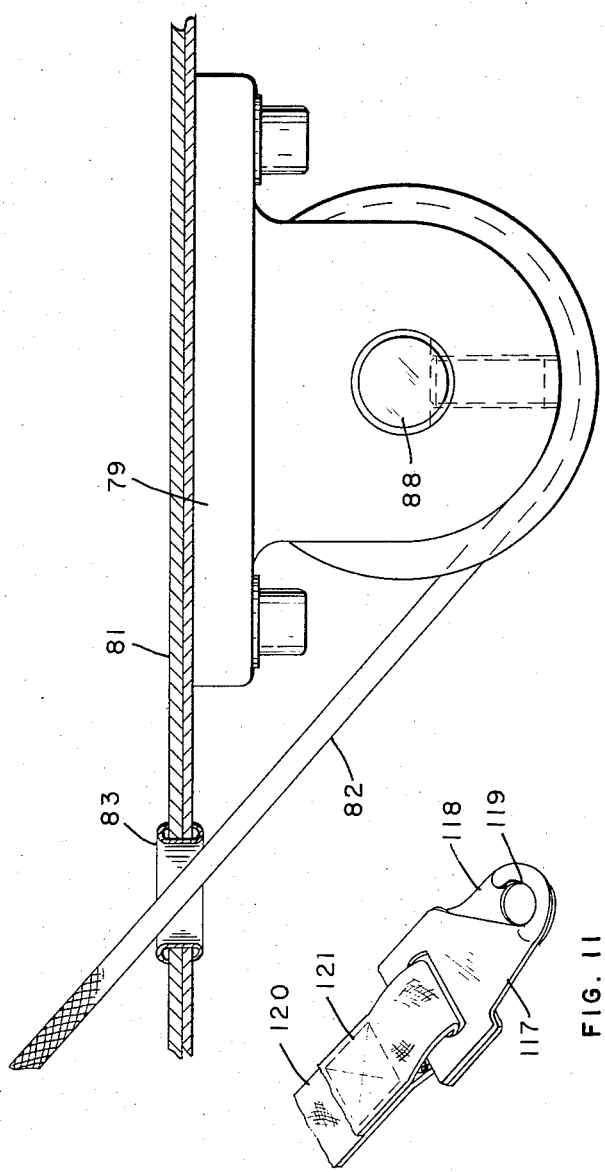

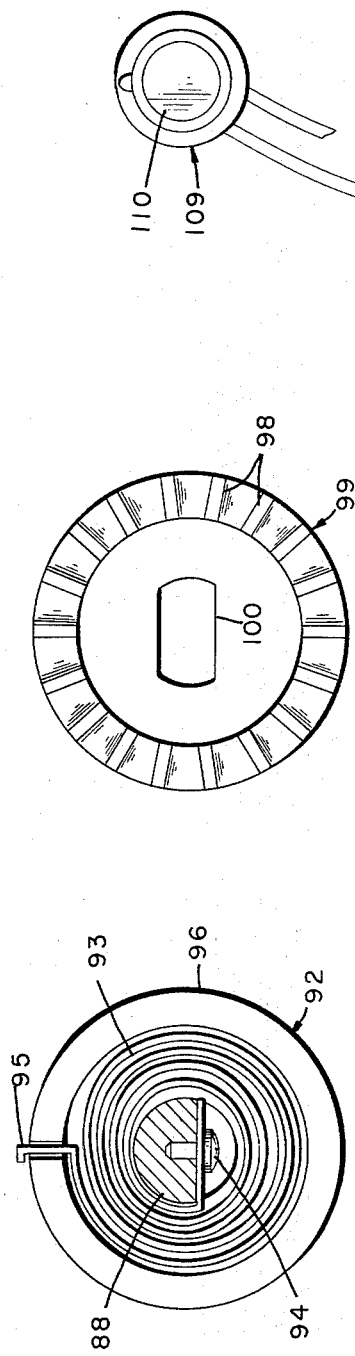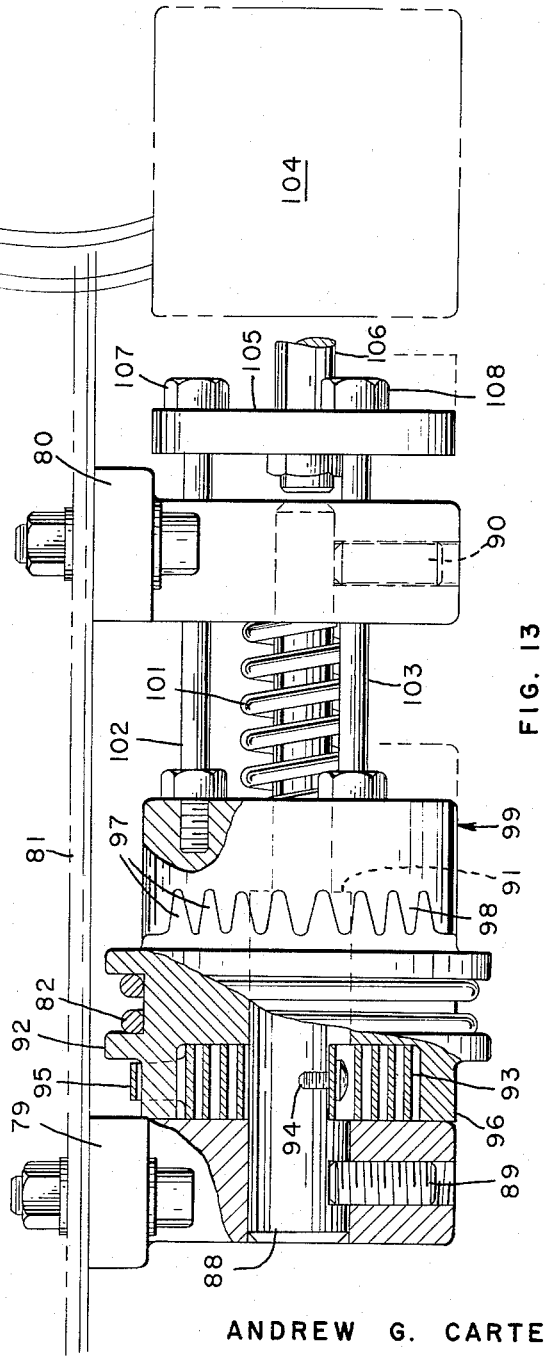

United States Patent Office 3,248,149
Patented Apr. 26, 1966

3,248,149
SEAT BELT TERMINAL SYSTEM
Andrew G. Carter, 2930 Lake Drive SE.,
Grand Rapids, Mich.
Filed Aug. 8, 1963, Ser. No. 300,220
4 Claims. (Cl. 297—88)

This invention relates to the securing of seat belts in vehicles. The forces applied to these belts under crash conditions run to thousands of pounds, and the usual anchoring device is secured to the floor or the frame of the vehicle behind the seat to resist these forces. The belt is conventionally run from this point upward and forward between the seat and back, and emerges above the seat where it is accessible to the user. When the belt is disconnected, it becomes an inconvenient object that interferes with the passengers, and often assumes random positions with the belt twisted and the buckle difficult to locate. The conventional belt has also shown a tendency to drop beside the seat and become soiled with dirt on the floor of the vehicle. The next use of the belt has the effect of applying the dirt to the clothing of the user.

The adjustment of a safety belt to proper length has also been an inconvenience. Change from one user to another will normally require re-adjustment, and shifting of the seat position has presented the same problem. It is the purpose of this invention to remove these inconveniences, and thereby decrease the resistance to the use of this equipment without decreasing the security of the terminal system under any conditions.

In one modification of the invention, there is a substantial increase in safety over the conventional safety belt installation. In an arrangement where the belt extends from the user down to the floor terminal, it is obvious that a crash will result in the belt having to hold not only the user but the seat as well. Normally, the seat mounting has been entirely inadequate to resist crash conditions. The added mass of the seat correspondingly increases the tendency of the belt to cause internal injury to the user. In the preferred form of this invention, the seat is independently secured to the vehicle, and the belt is then arranged to act between the user and the seat only, thus freeing him from the inertia effect of the seat under crash conditions. This feature is especially valuable when small children are secured with safety belts, as their bodies are not as well able to resist the increased belt forces attributable to the seat inertia.

To compensate for variations in seat position, and the difference in girth of the various users of a belt, this invention utilizes a terminal system preferably including a biasing for removing slack, coupled with a releasable locking action that must be positively operated to permit extension. This provides a "fail safe" installation in which the normal condition is that in which the belt is locked for protecting the user. Release of the floor anchor is provided in conjunction with the latch controlling the seat position, and the release of the belt itself (when secured to the seat) is then preferably controlled by a pedal actuator or a timing device limiting the time of release to a few seconds. Either of these leaves the hands free to manipulate the two sections of each belt.

While the preferred form of the invention involves the independent securing of the seat to the vehicle, coupled with securing the user to the seat, much of the value of the system can be realized by less complete installations. The nature of these can be summarized as follows:

(a) An automatic compensating anchor mounted on the vehicle and connected directly to the belt.

(b) An automatic compensating anchor on the seat belt only, with suitably heavy crash-resisting structure securing the seat to the vehicle.

(c) An automatic compensating anchor securing the seat to the vehicle, leaving the belt to be secured to the seat and manually adjusted.

The various modifications described herein have the common characteristic of acting as components of the total stress-transfer system which may include the seat, and which sustains the crash forces from the belt and transfers them to the floor structure or frame of the vehicle. The use of these modifications has the over-all function of compensating the stress-transfer system to provide for the necessary adjustment and variations of position of the belt, and yet removing all slack prior to crash conditions so that the belt system will produce the optimum degree of restraint on the user. The inherent action of the system also results in a convenient retraction of all slack from the uncoupled belt, and the release of the locking arrangements to permit belt extension is maintained on a strictly fail-safe basis. While it may be granted that the total risk of a safety system is theoretically increased by the number of components subject to failure, it must also be recognized that the system must be of such convenience that people will use it. A system of zero failure potential that is not used because of inconvenience is not of much value.

The several features of the invention will be analyzed in further detail through a discussion of the particular embodiments illustrated in the accompanying drawings. In the drawings:

FIGURE 1 presents a side elevation showing a mechanism for adjustably securing the belt to the seat structure.

FIGURE 2 presents a plan view of the control portion of the mechanism shown in FIGURE 1, on an enlarged scale.

FIGURE 3 illustrates a modified form of control usable in conjunction with the FIGURE 1 mechanism.

FIGURE 4 illustrates the belt terminal portion of the mechanism shown in FIGURE 1, in a fragmentary plan view on an enlarged scale from that of FIGURE 1.

FIGURE 5 presents a sectional elevation showing the reel structure of the FIGURE 1 terminal system.

FIGURE 6 is a section on an enlarged scale showing the guide mounting for the movable bar of the belt clamp shown in FIGURES 1 and 4.

Figure 7:
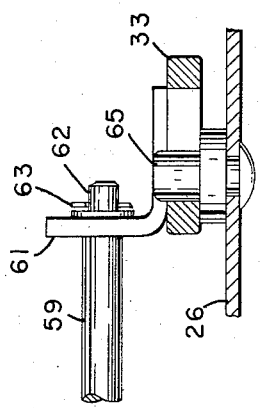

FIGURE 7 is a section in front elevation showing the cross-section of the frame of the belt clamp of the FIGURE 1 mechanism.

Figure 8:
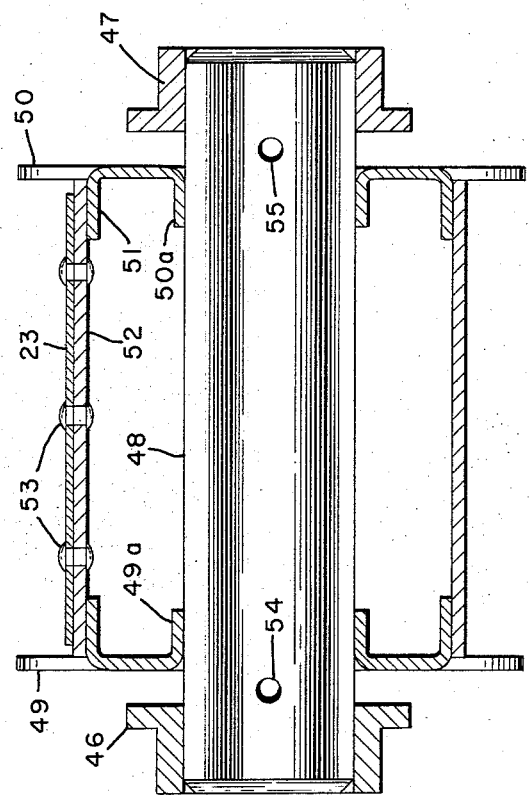

FIGURE 8 is a sectional elevation on an enlarged scale from that of FIGURE 5, showing the details of the reel structure.

Figure 9:
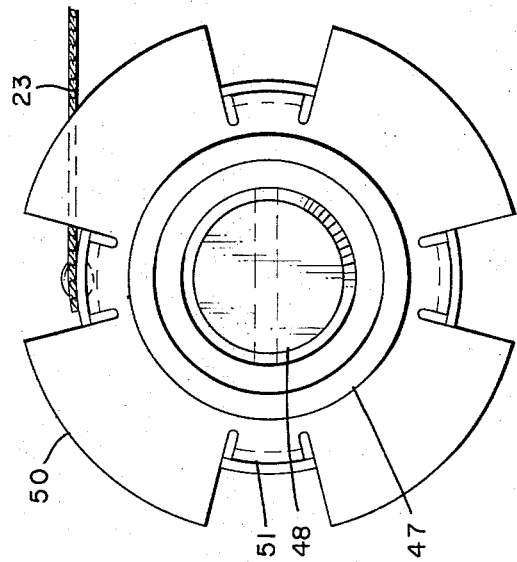

FIGURE 9 is an end view of the reel shown in FIGURE 7.

FIGURE 10 is a sectional side elevation showing the anchoring device preferably used in conjunction with the FIGURE 1 adjustable belt system for securing the seat with respect to the vehicle.

FIGURE 11 illustrates a sister-hook type coupling which may be used for securing a belt directly to the cable of the adjustable terminal shown in FIGURE 10, when desired.

FIGURE 12 is a schematic illustration showing an interrelationship between the latch mechanism for securing the seat position and the locking control for the seat terminal shown in FIGURE 10.

FIGURE 13 presents a sectional elevation showing the details of the lockable anchoring device shown in side elevation in FIGURE 10.

FIGURE 14 is a section perpendicular to the axis of the mechanism shown in FIGURE 13, and illustrating the spring biasing system of the anchoring device.

FIGURE 15 presents a view on a plane perpendicular to the axis of the mechanism of FIGURE 13, showing the preferred formation of the clutch teeth of the anchoring device.

Referring to FIGURE 1, the contour of a conventional front seat of an automobile is shown in dotted lines at 20, and the back of the seat is indicated at 21. A portion of a length of belt, indicated at 22, emerges between the seat and back, and normally will include a buckle arrangement (not shown) which connects the portion 22 with a similar portion forming the opposite side of a belt normally embracing the passenger. The structure shown in FIGURE 1 serves the primary purpose of adjustably securing the belt with respect to the seat, the securing of the seat to the vehicle being accomplished either through especially heavy mounting structure for the seat, or through the use of an adjustable terminal device such as will be described later in this text in conjunction with FIGURE 10 and the figures related thereto.

The belt 23, of which the portion 22 rests above the seat, extends downward and through a guide bracket 24. This member appears from various points of view in FIGURES 1, 4 and 6. It includes a base 25 secured to the seat structure generally indicated at 26 by bolts 27 and 28. The seat structure is conventionally mounted for at least front-to-rear adjustment on the vehicle at the legs 26a and 26b. The bracket 24 is preferably formed of sheet steel, and is bent upwardly to form sides 29 and 30 which are slotted as shown at 31 and 32 to receive the movable bar 33 and the fixed bar 34. The top portions 35 and 36 are preferably continuations of the sides 29 and 30, and terminate at the rear end in the arcuate guides 37 and 38 which provide a rounded contour for the belt 23 to avoid any tendency to tear the material. The bar 33 is normally free to move toward and away from the fixed bar 34, and the application of tension to the belt 23 (via the portion 22) will result in a tendency to draw the movable bar 33 against the fixed bar 34, and create a jamming action which will clamp the belt adequately to resist the belt tension involved in crash conditions.

In the absence of tension applied to the portion 22, it is desirable that the slack be automatically taken up so that the buckle components and the portion 22 are positioned at a regular location to avoid interference with the passengers, and prevent movement of the belt to the floor where it can become soiled. The reel structure generally shown at 39 forms, together with the clamping arrangement associated with the bracket 24, a lockable take-up device. The structure of this reel is best shown in FIGURE 5. The brackets 40 and 41 are fixed with respect to the seat structure 26 by the bolts 42-45, and each of these brackets includes a bearing as shown at 46 and 47 for rotatably receiving the shaft 48. A spool constructed as shown in FIGURES 8 and 9 is fixed with respect to the shaft 48, and includes the end plates 49 and 50 provided with the collars 49a and 50a secured to the shaft 48 preferably by brazing or welding. Portions of these plates are bent as shown at 51 to form shoulders around which a generally cylindrical piece 52 is positioned and secured by any convenient technique. The belt 23 may be attached to the spool by rivets as shown at 53, or any other convenient system of attachment may be used. The shaft 48 is provided with holes 54 and 55 for receiving the inner ends of the spiral springs 56 and 57 (refer to FIGURE 5), and the outer ends being secured to a convenient point fixed with respect to the seat structure. This assembly is preferably surrounded by a housing 58 provided with a suitable aperture for the emergence of the belt 23. The biasing action of the springs 56 and 57 provides a tendency to wind the belt 23 on the reel, and the position of the belt with respect to the fixed and movable bars 34 and 33 is such that jamming action does not develop as the reel 39 draws the belt in to remove slack from the seat portion 22.

When the user of the belt wishes to apply it around himself, an arrangement must first be made for release of the jamming action provided by the bracket 24 and the bars 33 and 34. This is accomplished by forceably displacing the movable bar 33 in a forward direction, or away from the fixed bar 34. The illustrated arrangement for accomplishing this involves the rod 59 which is slidably and rotatably mounted in the bracket 60, which is secured to the seat structure 26. The end of this rod is also secured to the bracket 61 carried by the enlarged central portion of the bar 33 (FIG. 2), with the rod 59 having a portion of reduced diameter at the end shown at 62 which permits the rod to be axially fixed with respect to the bracket 61 by the cotter pin 63 and the washer 64. It may be noted here that the bar 33 is centrally located between a pair of take-up devices representing the opposite ends of the belt assembly embracing a particular passenger, with the bar 33 being acted upon at its center portion by the rod 59. The bar is slidably mounted on the seat structure by vertical guide pins as shown at 65, as shown best in FIGURE 7. These guide pins are preferably disposed symmetrically at opposite sides of the rod 59, and between the rod and the guide brackets 24.

The rod 59 is rotatable with respect to both the brackets 60 and 61, and a rotary cam 66 is secured to the bracket 60 at 66a to act in conjunction with the cam follower 67 on the rod 59. The rotary cam 66 provides a curved slot 68 which induces axial movement of the rod 59 in response to rotation applied by either the hand lever 69 or the pedal 70. These latter two components are part of the same member, so that actuation of the rod may be accomplished either by the hand or foot. It is desirable that the formation of the slots 68 shall be such that there will be no tendency for the follower 67 to retain the rod 59 in a forward position such as would correspond to release of the clamping action against the belt 23. The spring 71 is provided to apply a biasing action tending to move the rod 59 to the rear, and to establish a clamping on the belt 23. The spring 71 acts between the washer 72 supported by the bracket 60 and the washer 73 which is axially fixed with respect to the shaft 59 by the cotter pin 74. Normal actuation of this modification of the invention will be through the use of the pedal 70. In this manner, the hands are both left free to pull on the belt sections 22 and manipulate the components of a conventional buckle (not shown) to connect them together. After the hands have released the belt on completion of coupling the buckle sections, the take-up devices 39 will immediately remove the slack from the belt sections 22. The assembly thus described has a notable fail-safe characteristic, as it is normally impossible for the driver to proceed along the highway without taking his foot off the pedal 70 so that it may be applied to the accelerator or brake. The moment the torsion is removed from the shaft 59, the action of the spring 71 will immediately move the shaft to the rear so that clamping action may be applied to the belt.

An alternative to this arrangement is shown in FIGURE 3. The shaft 59a is connected to the bar 33a in the same fashion as previously described, and a spring indicated at 71a exhibits the same tendency to move the shaft 59a and the bar 33a to the rear to generate clamping action. The bracket 60a supports the shaft 59a as previously described, but the axial movement of the shaft is controlled by a solenoid 75. The solenoid is connected to a suitable source of electrical energy through the wires 76, with the circuit including the timer switch 77 preferably mounted on the dash board of the automobile. Manual actuation of the timing device (as by rotating the knob 78) will establish a particular period of time (such as ten or twenty seconds) in which the solenoid 75 will be actuated to draw the rod 59a forward and release clamping action. On the expiration of the time period, the current will be interrupted to the solenoid 75, and the spring 71a will return the rod 59a and the bar 33a to clamping position. Timing switches of the type indicated at 77 are conventional, and form no part of the present invention.

The device described in conjunction with FIGURES 1 through 9 has been applied to provide a fail-safe take-up device for securing the belt with respect to the seat. The unit shown in FIGURES 10 through 15 is preferably associated with securing the seat with respect to the vehicle, which would eliminate the necessity of providing a heavy crash-resistant mounting for the seat. The automatic compensating terminal shown in FIGURES 10 through 15 may also be connected directly to the seat belt, and then interrelated with the seat adjustment so that the control of the seat is used as a basis of releasing the locked condition of the terminal to permit shifting of the seat position. The compensating lockable terminal best shown in FIGURES 10 and 13 includes a pair of spaced brackets 79 and 80 secured to the floor structure 81 of a vehicle. The illustrated installation is mounted underneath the floor, and a cable 82 passes upwardly and forwardly at an incline through a hole in the floor structure lined by the grommet 83. The cable 82 may extend to a point of connection with the seat structure 84 at the shackle 85. The shackle is of conventional design, and is secured to the seat structure 84 by nuts as shown at 86. A clamp 87 secured by the nut 88 defines a loop in the cable 82 which embraces the shackle 85 in the conventional manner.

The brackets 79 and 80 support the shaft 88 in non-rotatable relationship which is fixed with respect to the vehicle, and the shaft is maintained in position by the set screws 89 and 90. The shaft 88 engages a circular hole in the bracket 79, but engages a non-circular opening in the bracket 80 which conforms to the cross-section of the right-hand portion of the shaft 88 which is provided with flattened sides. At the point shown at 91 in FIGURE 13, the shaft 88 changes from a generally circular cross-section to the double flat arrangement. A spool 92 is rotatably mounted on the circular portion of the shaft 88, and the spiral spring 93 has its inner end fixed to the shaft 88 by the screw 94. The outer extremity of the spring 93 is indicated at 95, and extends through a radial slot in the portion 96 of the spool. The function of the spring 93 is to apply a biasing action tending to wind the cable 82 on the spool. The right-hand end of the spool 92 is provided with axially-extending teeth as shown at 97, and these mate with similar teeth 98 on the locking clutch member 99. This member is shown in end elevation in FIGURE 15, and the central hole 100 slidably receives the right-hand portion of the shaft 88 so that the clutch member 99 is slidable but not rotatable with respect to the vehicle. Sliding movement of the clutch member to the right releases the spool 92 so that the rotary position of the spool then is determined as a balance between the action of the spring 93 and the tension on the cable 82. The spring 101 acts to bias the clutch 99 into the locking position shown in FIGURE 13, and the clutch is released from this by the application of tension to the rods 102 and 103 by the operation of the solenoid 104 which pulls the yoke 105 with the actuating rod 106. The yoke 105 is connected to the rods 102 and 103 by suitable nuts as shown at 107 and 108. A fail-safe installation is maintained by the actuation of the solenoid 104 by the manually-operated timing device 109, preferably mounted on the dash panel of the vehicle. Actuation of the knob 110 will provide a pre-determined period of a few seconds within which the solenoid 104 will move the clutch member 99 to the right enough to disengage the clutch and free the spool 96 so that slack in the cable 82 is taken up. This condition also permits the cable 82 to be paid out as the seat is moved forward, or as the seat belt is pulled around the user in the case of a direct connection to the belt. As an alternative to the timer-control arrangement, a mechanical installation may be applied as shown in FIGURE 12. The shaft 111 is a part of the conventional seat latch arrangement, which is rotated by the usual manual lever (not shown) to permit forward or rearward movement of the seat. This shaft is mounted on suitable brackets as shown at 112 secured to the floor structure 113. A radius arm 114 is applied to the shaft 111 to interrelate the operation of the seat latch with a compensating terminal of the type shown in FIGURE 13. Rotation of the shaft will then induce movement of the link 115, which will correspondingly move the yoke 116 connected to the rods 102a and 103a which are functionally identical to the rods 102 and 103 of FIGURE 13. This can be accomplished electrically by using the seat latch control to actuate a switch which would replace the time 109 of FIGURE 13.

When it is desirable to connect the cable 82 directly to the seat belt, the usual sister-hook arrangement shown in FIGURE 11 may be used. This type of coupling forms no part of the present invention, and involves a pair of similarly formed plates 117 and 118 which are placed in oppositely-facing relationship so that together they define an opening 119 for engaging a loop in the cable 82 such as is established by the clamp 87 in FIGURE 10. The belt 120 is also conventional, and is provided with a loop established by the sewing shown at 121 which embraces the two hook elements 117 and 118.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. In combination with a vehicle having a movable seat and latch means for securing the selected position of said seat, an adjustable safety belt terminal system comprising:
   at least one belt section having a portion normally disposed above said seat;
   a lockable anchor take-up device secured to said vehicle and connected to said seat, said anchor device including biasing means applying relatively light rearward force to said seat to remove all slack between said seat and said anchor device; and
   a lockable take-up device secured to said seat and engaging said belt section, said take-up device including biasing means tending to shorten said belt section portion, and also including releasable means normally preventing extension of said belt section portion.

2. A system according to claim 1 in which said seat take-up device is releasable in response to a pedal actuator.

3. A system according to claim 1 including timer means for controlling the release of said releasable means.

4. In combination with a vehicle having a seat, a safety belt terminal system comprising:
   at least one belt section having a portion disposed above said seat;
   releasable terminal means including belt roll-up means operable to secure said belt section with respect to said vehicle stress-transfer means extending from said seat to a point of connection to relatively fixed structure of said vehicle rearward of said seat, said stress-transfer means including a portion having biasing means operable to apply tension toward said point of connection,
      said terminal means including a pedal release control, and being releasable in response thereto.

References Cited by the Examiner

UNITED STATES PATENTS

| | | | |
|---|---|---|---|
| 805,634 | 11/1905 | Colvin | 242—74.1 |
| 1,209,593 | 12/1916 | Keiser | 242—74.1 |

(Other references on following page)

UNITED STATES PATENTS

| | | | |
|---|---|---|---|
| 1,859,150 | 5/1932 | Moran | 297—390 X |
| 2,257,099 | 9/1941 | Beirise | 297—388 X |
| 2,725,097 | 11/1955 | Thoreson | 297—388 |
| 2,771,128 | 11/1956 | Doolittle | 297—386 |
| 2,850,082 | 9/1958 | Day | 280—150 |
| 2,883,123 | 4/1959 | Finnigan | 297—388 X |
| 2,905,231 | 9/1959 | Olson | 297—388 X |
| 2,947,353 | 8/1960 | Von Wimmersperg | 297—388 |
| 2,977,655 | 4/1961 | Peter | 24—196 |
| 3,020,089 | 2/1962 | Monroe | 297—388 |
| 3,032,374 | 5/1962 | Robinson et al. | 297—388 |
| 3,128,124 | 4/1964 | Fredericks et al. | 297—388 |

FOREIGN PATENTS

| | | |
|---|---|---|
| 777,981 | 7/1957 | Great Britain. |

FRANK B. SHERRY, *Primary Examiner.*

CHANCELLOR E. HARRIS, *Examiner.*